United States Patent [19]
Nozel et al.

[11] Patent Number: 5,022,626
[45] Date of Patent: Jun. 11, 1991

[54] VEHICLE ACCESSORY STAND

[76] Inventors: Richard J. Nozel, 354 Edith Dr., West St. Paul, Minn. 55118; Ulric W. Trombley, R.R. #1, Chisago City, Minn. 55013; Gerald M. Brust, 361 Ponderosa Dr., Post Falls, Id. 83854

[21] Appl. No.: 509,517

[22] Filed: Apr. 16, 1990

[51] Int. Cl.⁵ .............................................. A47K 1/08
[52] U.S. Cl. .......................... 248/311.2; 224/42.45 R
[58] Field of Search ................. 248/311.2; 211/71, 74; 224/42.45 R, 42.11, 42.44, 327, 42.43

[56] References Cited

U.S. PATENT DOCUMENTS

| | | | |
|---|---|---|---|
| 2,243,190 | 5/1941 | Capaldo | 403/378 X |
| 3,458,095 | 7/1969 | Stall | 224/42.45 X |
| 3,550,001 | 12/1970 | Hanley | 224/42.44 X |
| 3,727,813 | 4/1973 | Eby | 108/44 X |
| 3,964,612 | 6/1976 | Skilliter | 224/42.42 R X |
| 4,006,852 | 2/1977 | Pilsner | 224/42.45 R X |
| 4,061,258 | 12/1977 | Dysart | 224/42.45 R X |
| 4,087,126 | 5/1978 | Wynn | 224/42.42 X |
| 4,364,499 | 12/1982 | McCue | 224/42.45 R |
| 4,524,701 | 6/1985 | Chappell | 108/44 |
| 4,877,164 | 10/1989 | Baucom | 224/42.45 R X |

Primary Examiner—J. Franklin Foss
Attorney, Agent, or Firm—Douglas L. Tschida

[57] ABSTRACT

Apparatus comprising a vehicle mounted support coupler, an upright stanchion and an accessory support platform. In combination, the stanchion is mountable to a vehicle chassis or seat for advantageously supporting accessory items relative to the operator, yet permitting selective removal when not required. Liquid drinks and sundry other items are supportable from the stand.

7 Claims, 4 Drawing Sheets

VEHICLE ACCESSORY STAND

BACKGROUND OF THE INVENTION

The present invention relates to vehicle mounted accessory supports and in particular to a removable upright stanchion assembly.

Operators of pickup trucks, vans, recreational vehicles and automobiles oftentimes, while operating the vehicle, are faced with the difficulty of supporting a liquid drink container in stable relation to the vehicle. Accordingly, a variety of assemblies have been developed to this end. Some of those assemblies of which Applicant is aware provide for shaped arm members which mount to the window, the window frame, the dashboard or the engine cowling.

Depending upon the assembly, some either mount in a temporary or in a permanent fashion. Temporary mount assemblies conventionally support a single drink container, whereas permanent mount assemblies are typically constructed to support a plurality of containers and other items. Permanent mount assemblies, however, can disadvantageously mar the vehicle's interior trim, when removed.

Operators of pickup trucks, who desire the convenience and advantages of permanent mount assemblies, but who occasionally may desire to seat two or more passengers in the vehicle cab, are presented with a further difficulty or limitation of cramped space constraints. This is especially the situation if the vehicle provides a cab design which accommodates only two to three persons, as opposed to a so called extended cab or crew cab design. Accordingly, such individuals are not able to utilize most available permanent mount platform assemblies.

In appreciation of the foregoing difficulties, Applicant has developed a removable stanchion assembly for supporting a number of accessory or convenience items relative to a vehicle operator, yet which is selectively removable from the vehicle when additional space is required.

SUMMARY OF INVENTION

It is therefore a primarY object of the present invention to provide a selectively detachable upright stanchion for supporting an accessory platform relative to a vehicle operator.

It is a further object of the invention to provide a coupler, including latch means for restraining the upright stanchion thereto and wherein the stanchion includes an attachment means for securing a drink container support thereto.

It is a further object of the invention to provide a plurality of accessory supports along the upright stanchion.

It is a still further object of the invention to provide an extensible stanchion.

Various of the foregoing objects and advantages are particularly achieved in a presently preferred construction wherein the vehicle coupler provides for a right angled vehicle mounting portion having a slip-coupler collar portion for restrainedly receiving an upright support stanchion. The stanchion can be of either a fixed-length or of an extensible construction and can be bent to a desired form. An attachment plate secured to the upper end of the stanchion facilitates mounting of a drink support platform or C.B. radio thereto.

Still other constructions, objects, advantages and distinctions of the invention will become more apparent hereinafter upon reference to the detailed description thereof with respect to the appended drawings. It is to be appreciated however that the following description is illustrative only of presently considered forms of the invention and should not be strictly limited or construed to the construction disclosed. Rather, the invention is to be interpreted within the spirit and scope of the following presented claims.

DESCRIPTION OF THE PREFERRED EMBODIMENT

Figure 1:
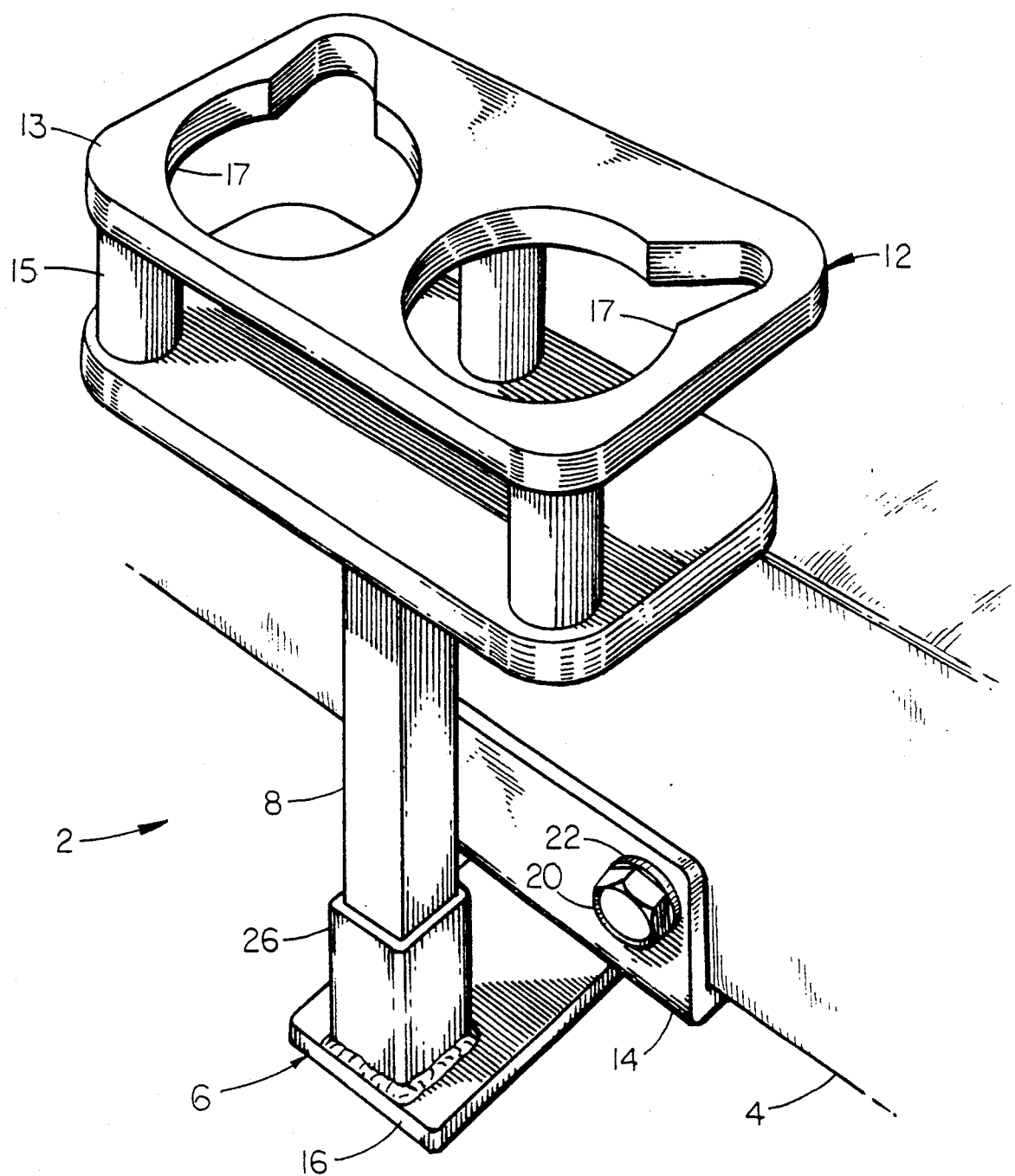
FIG. 1 shows an isometric drawing of the present accessory stanchion in mounted relation to a vehicle seat.
Figure 2:
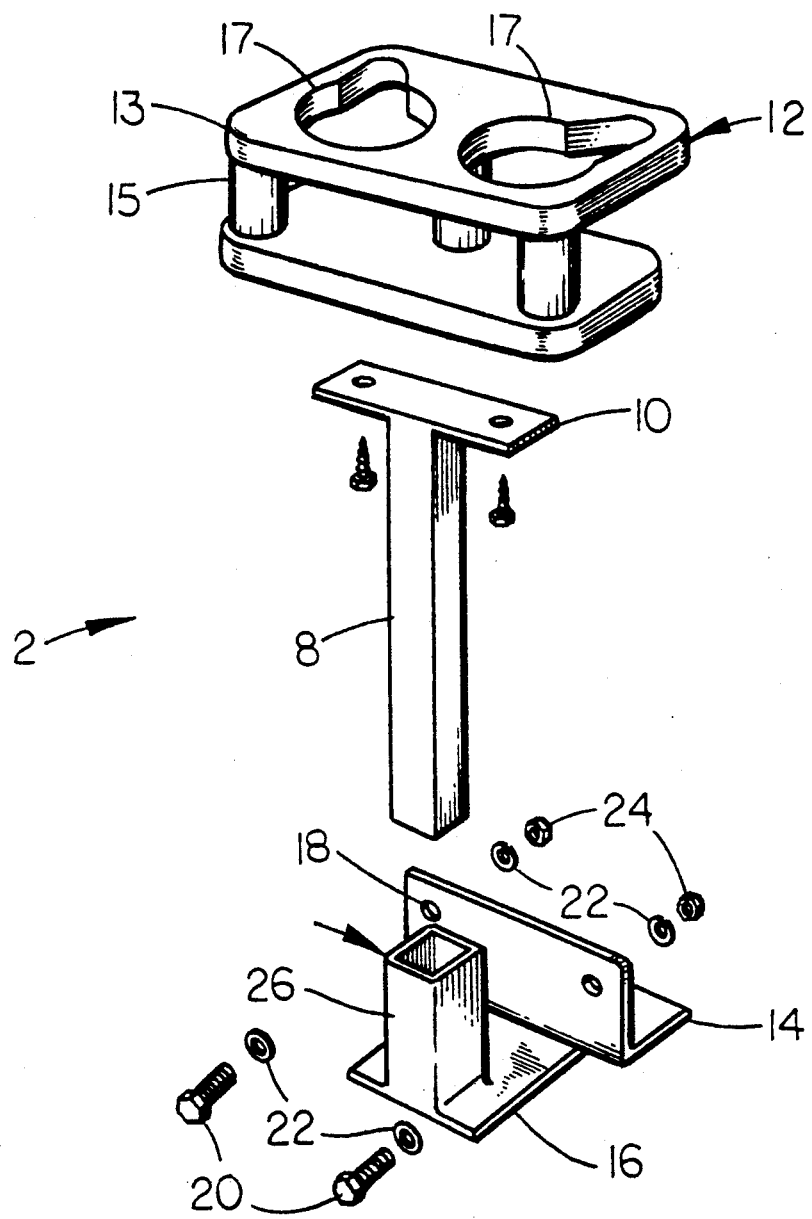
FIG. 2 shows an isometric exploded assembly drawing of the accessory stanchion.

Referring to FIG. 1, an isometric drawing is shown of the accessory stand 2 of the present invention in mounted relation to a bench-type seat 4. For such a mounting, the stand 2 is secured to an angle iron, primary frame member (not shown) which typically runs the length of the lower front face of the seat 4. FIG. 2, otherwise, shows an exploded isometric drawing of the stand 2.

With attention to these drawings, the stand is generally comprised of a coupler portion 6, a removable stanchion or column 8, and an accessory attachment plate 10. Secured to the top of the attachment plate 10 is a drink container support platform 12, which can be of a variety of constructions. For the platform 12 shown, an apertured rail 13 is provided which is vertically offset via spacers 15 to support a drink container in each aperture 17. Accordingly, the stand 2 serves to conveniently position the platform 12 and/or any other accessories, for example, a citizens band radio, mounted to the stand 2 within reach of a vehicle operator.

The stand 2 is particularly secured to the seat 4 at a right angled mounting bracket 14. The bracket 14 is welded to a flat base member 16 and includes a plurality of mounting holes 18 which align with holes formed in the seat frame. Bolts 20, washers 22 and nut fasteners 24, in turn, secure the bracket 14 to the seat 4.

Vertically projecting from a forward portion of the flat base 16 is a tubular collar 26 which has an inside diameter closely approximating the outside diameter of the upright stanchion 8. The stanchion 8 is removably mountable in slip fit relation within the collar 26. A stable, normally secure mounting is thus obtained for the stanchion 8.

Appreciating, however, the possibility of travel over rough terrain, the alternative stanchion construction of FIG. 3, which will be discussed in greater detail below, shows a stanchion 28 wherein alignable through holes 29 are provided in a collar 30 and the stanchion 28 and wherethrough a pin fastener 31 is mountable to restrain one to the other. A fastened stanchion 28 is also particularly desired where the stanchion 28 exhibits a circular cross sectional shape, as opposed to the square or rectangular cross sectional shape of FIGS. 1 and 2; and, whereby rotation is prevented.

In lieu of a restraint pin 31, it is to be further appreciated that a variety of spring biased detente assemblies can alternativelY be used, as well as various set screw and latch arrangements which can be positioned to secure the aligned stanchion 8 or 28 to the collar 26 or 30 through holes. Similarly, in lieu of a tubular collar 26, a solid peg of mating cross sectional shape might project from the base 16 to mount inside the bore of the stanchion 8.

Figure 3:
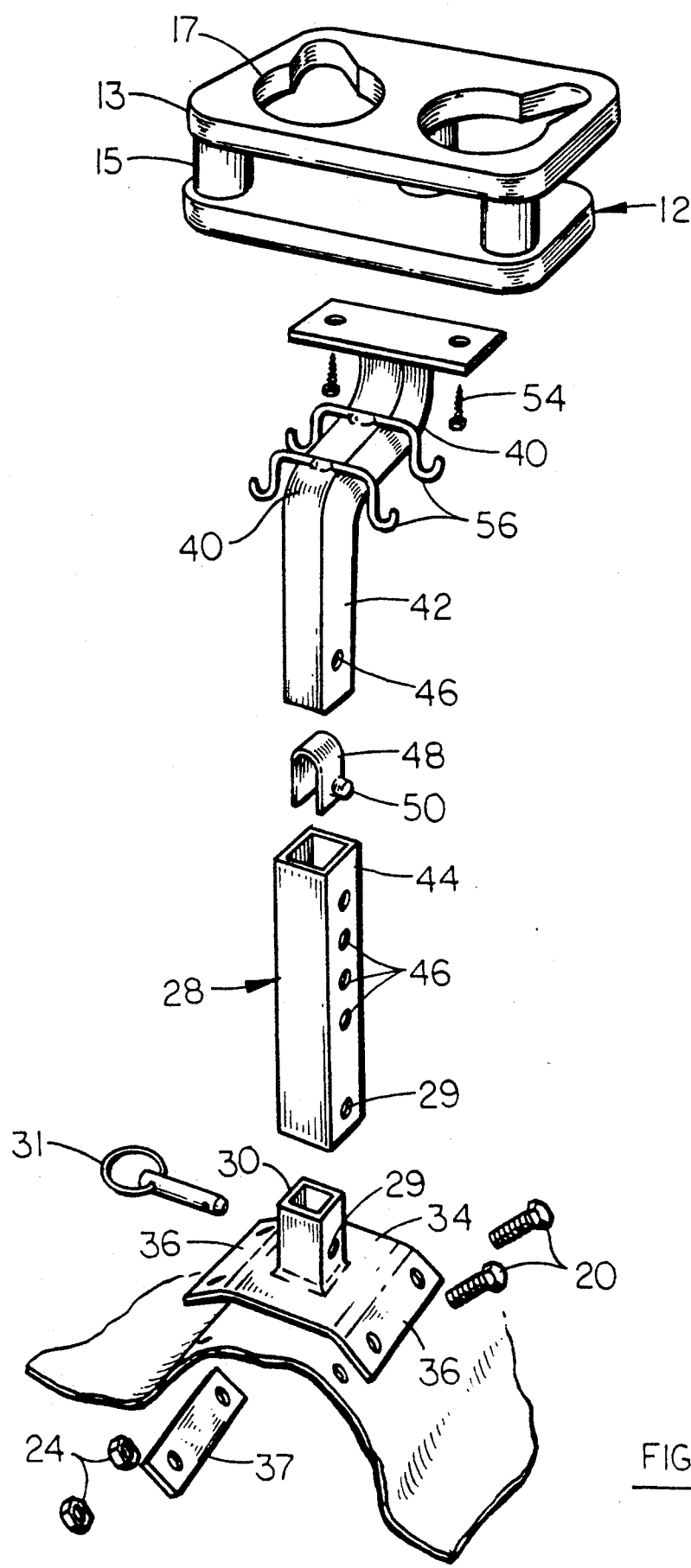
FIG. 3 shows an alternative latchable, floor mounted assembly which includes an offset extensible upright stanchion.

With still further attention directed to FIG. 3, an alternative floor mounted assembly 32 is disclosed. This assembly can advantageously be employed in vehicles having so called "bucket" or single person seats which do not readily permit the mounting of a stand assembly 2 thereto. For such vehicles, the base comprises a flat plate 34 having radiused edges 36 which can be directly secured to the vehicle floor, again with bolt and nut fasteners 20, 24 or the like. The base 34, due to its radiused edges can be mounted over the driveshaft hump in most vehicle floors. A draw plate 38 is also provided in lieu of separate washers 22.

Slip mounting within the collar is the upright stanchion 28. The stanchion 28 is formed to include back-to-back bends 40 which serve to properly position the stanchion 28 relative to the vehicle occupant.

Although a fixed length stanchion most commonly would be used, such as in FIGS. 1 and 2, the stanchion 28 of FIG. 3 discloses an alternative, extensible arrangement having slide mounted upper and lower sections 42, 44 which include a plurality of alignable through holes 46. A spring biased pin fastener 48 mounts within the upper section 42 such that a pin portion 50 projects from the selected through hole 46. The pin 50 can thus be selectively positioned within one of the holes 46 of the lower section 44 and whereby the overall length is established.

Welded lastly to the uppermost end of either stanchion 8 or 28 is a flat, drilled weldment 52 whereat the accessorY platform 12 having a plurality of drink support apertures is mounted with appropriate fasteners 54.

Without the flexibility of the present stanchion assemblies 8 and 28, such holders 12 are predominantly restricted to vehicles with relatively open flat, dashboard mounting surfaces. The present stanchions 8 and 28, however, further enable mountings in a pick-up truck. They also permit the vehicle operator to remove the holder 28 when it is not required.

Various other accessory features of the present stanchions 2 and 28 are the inclusion one or more hooks 56 which are securable to the stanchions for receiving trash collection containers, supporting a hat, sunglasses or other paraphernalia without cluttering the surface of the dash board. Spring biased clips, such as used on clip boards may similarly be secured to the columns 8, 28 to support still other items. Moreover, electronic appliances such as CB radios or AM/FM radios can be mounted permanently to the stanchion.

Figure 4:
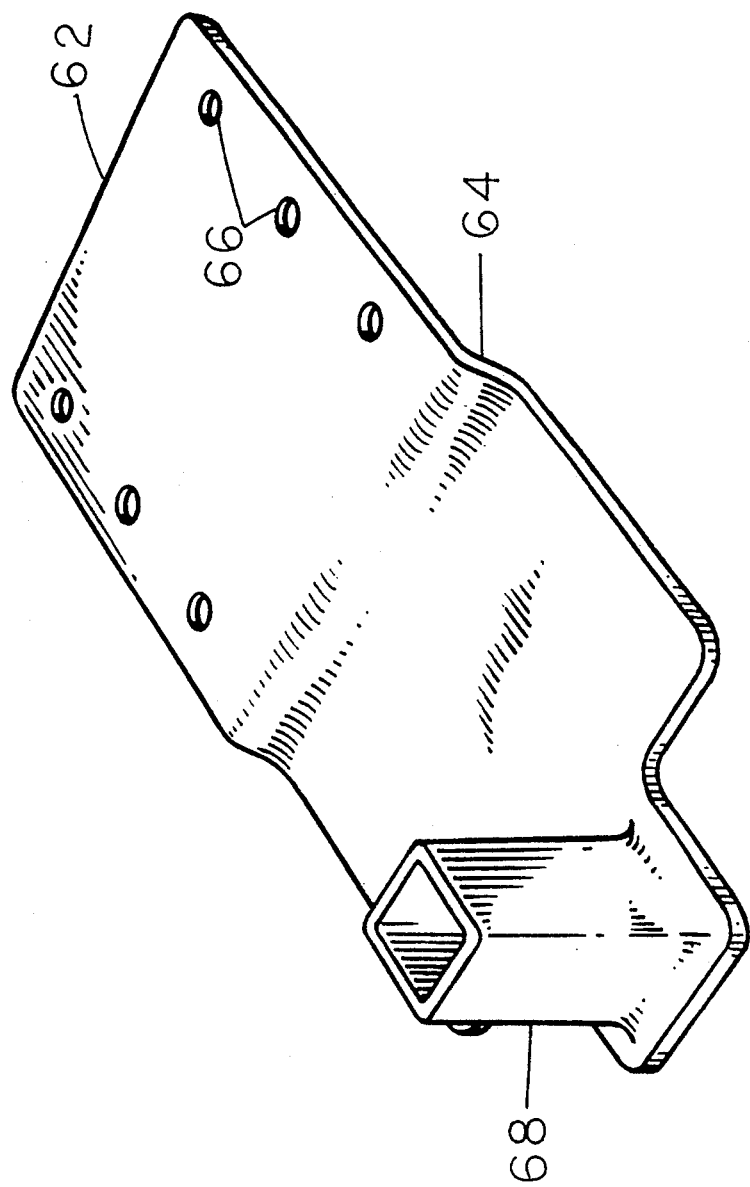
FIG. 4 shows an alternative seat mountable coupler.

FIG. 4 lastly disclose another coupler assembly 60 which is usable with late model pick-up trucks. The assembly 60 provides a plate 62 having an offset bend 64 which permits mounting the plate 62 to the bottom of a vehicle seat at provided holes 66. A tubular collar 68 project from the fore-end of the plate 62 to receive an appropriate stanchion 8, 28.

While the present invention has been described with respect to its presently preferred and variously considered alternative constructions and modifications, it is to be appreciated that still other constructions may suggest themselves to those of skill in the art. Accordingly, it is contemplated that the subject invention should be interpreted to include all those equivalent embodiments within the spirit and scope of the following claims.

What is claimed is:

1. An automotive accessory stand comprising:
   (a) a vertical stanchion having a non-circular cross sectional shape;
   (b) an accessory attachment plate secured to an upper end of said stanchion; and
   (c) coupler means including means for securing the coupler means to a vehicle seat frame and having a collar portion including a bore having a mating cross sectional shape to the stanchion for receiving and supporting the stanchion in non-rotative indexed relation to a vehicle seat.

2. Apparatus as set forth in claim 1 wherein a mating portion of each of said stanchion and collar portion include alignable apertures wherethrough a linch pin is non-permanently received.

3. Apparatus as set forth in claim 1 wherein said stanchion includes at least one hook member projecting therefrom.

4. Apparatus as set forth in claim 1 wherein said stanchion is comprised of at least first and second tubular portions of rectangular cross sectional shape and means for securing the tubular portions to one another to fix the overall length of said stanchion.

5. Apparatus as set forth in claim 4 wherein the stanchion length fixing means comprises a resilient clip member including a peg portion which peg projects from one of the first and second stanchion portions and selectively mates with an aligned aperture of the other of the first and second stanchion portions.

6. An automotive accessory stand comprising:
   (a) a stanchion comprised of a plurality of portions of non-circular cross sectional shape and means for telescopically mounting the portions to one another;
   (b) an accessory attachment plate secured to one end of said stanchion; and
   (c) coupler means comprising (1) a base, (2) a vertically upright collar secured tot he base having a bore of mating cross sectional shape to the stanchion for receiving the stanchion, (3) means for non-permanently securing said stanchion to said collar, and (4) a bracket secured to the base and shaped to mount to a vehicle seat frame.

7. An automotive accessory stand comprising:
   (a) a stanchion including a plurality of telescoping portions of non-circular cross sectional shape, some of which portions are straight and others of which include formed bends
   (b) a plurality of hooks mountable to ones of the stanchion portions;
   (c) an accessory attachment plate secured to an upper end of said stanchion;
   (d) coupler means for supporting the stanchion to a vehicle seat frame comprising (1) a base, (2) a vertically upright collar secured to the base having a bore of mating cross sectional shape to the stanchion for receiving the stanchion, (3) means for nonpermanently securing said stanchion to said collar, and (4) a bracket secured to the base and shaped to mount to a vehicle seat frame.

* * * * *